May 14, 1946. C. BRADLEY 2,400,096
PHOTOGRAPHIC MEASURING INSTRUMENT
Filed June 8, 1942 2 Sheets-Sheet 1
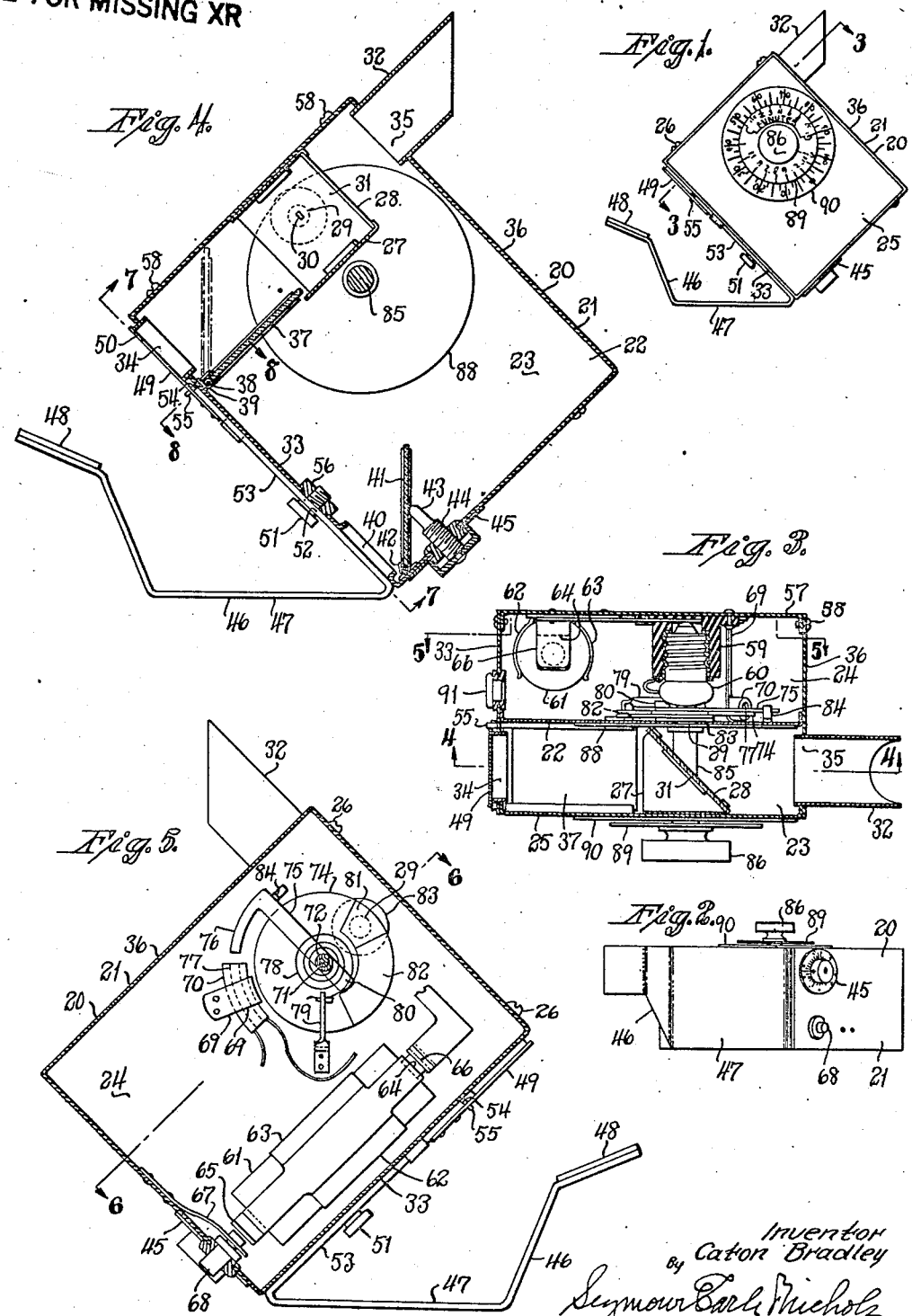
Inventor
Caton Bradley
by Seymour Earle Nichols
Attorneys May 14, 1946.  C. BRADLEY  2,400,096
PHOTOGRAPHIC MEASURING INSTRUMENT
Filed June 8, 1942  2 Sheets-Sheet 2
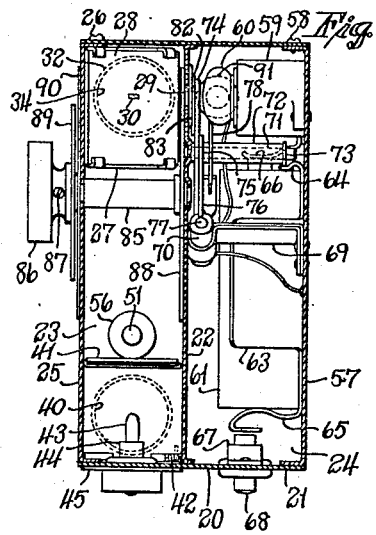
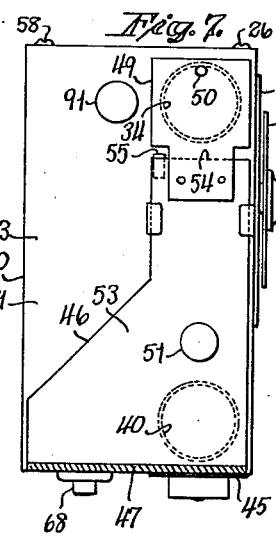
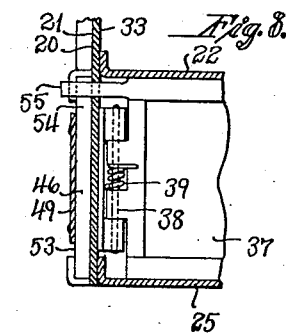
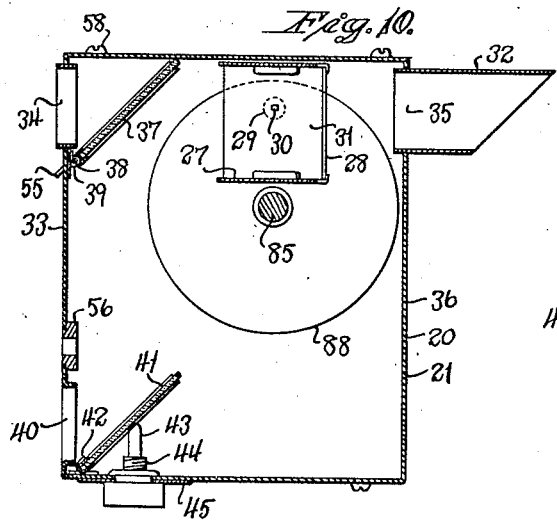
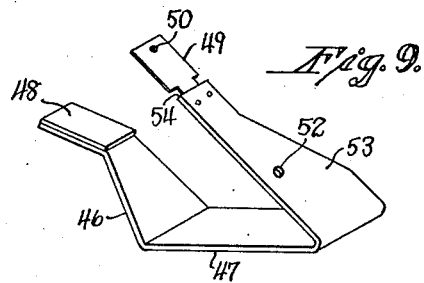
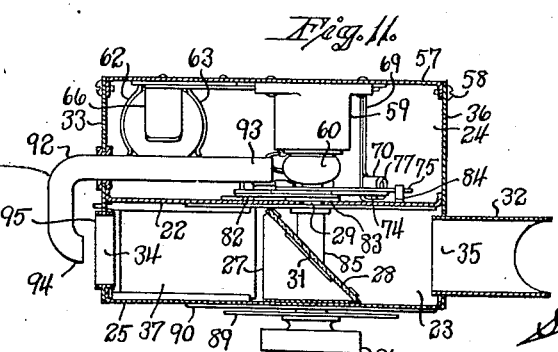
Inventor
Caton Bradley
by Seymour Earle Nichols
Attorneys Patented May 14, 1946

2,400,096

UNITED STATES PATENT OFFICE 2,400,096

PHOTOGRAPHIC MEASURING INSTRUMENT

Caton Bradley, Durham, Conn.

Application June 8, 1942, Serial No. 446,169

2 Claims. (Cl. 88—23)

This invention relates to improvements in photographic measuring instruments for measuring light values and determining distance from a viewed object to the point of observation.

One object of this invention is to provide an improved photographic measuring instrument which when used for measuring light intensities of a projected image, increases the brilliance of the field of view so that readings may be easily obtained in areas of minimum light.

Another object of this invention is to provide an improved photographic measuring instrument for obtaining exposure values, and distance to an object being photographed, through a single eyepiece.

Another object of this invention is to provide an improved photographic measuring instrument employing an artificial light-means, with means for maintaining the portion of the artificial light-means that is used as the standard, at a constant value even though the light itself may vary in intensity.

Another object of this invention is to produce an improved photographic measuring instrument formed of simple elements readily manufactured and readily assembled to produce an efficient construction at minimum cost.

With the above and other objects in view, as will appear to those skilled in the art from the present disclosure, this invention includes all features in the said disclosure which are novel over the prior art.

In the accompanying drawings, in which certain ways of carrying out the invention are shown for illustrative purposes:

Fig. 1 is a reduced-scale side elevation of a photographic measuring instrument made in accordance with the present invention;

Fig. 2 is a bottom plan view of Fig. 1;

Fig. 3 is an enlarged sectional view on line 3—3 of Fig. 1;

Fig. 4 is a sectional view on line 4—4 of Fig. 3;

Fig. 5 is a sectional view on line 5—5 of Fig. 3;

Fig. 6 is a sectional view on line 6—6 of Fig. 5;

Fig. 7 is a view, mostly in elevation, on line 7—7 of Fig. 4;

Fig. 8 is a fragmental sectional view on line 8—8 of Fig. 4;

Fig. 9 is a perspective view of the bracket;

Fig. 10 is a view similar to Fig. 4, but in a different rotational position, with the bracket removed; and Fig. 11 is a view similar to Fig. 3, of a modified construction.

In the description and claims, the various parts and steps are identified by specific names for convenience, but they are intended to be as generic in their application as the prior art will permit.

Referring to Figs. 1 to 10 inclusive of the drawings, the photographic measuring instrument 20 has a box or casing 21 provided with a partition 22 which divides the box or casing 21 into two compartments 23 and 24.

The compartment 23 is provided with a removable cover 25 which may be removably secured in place by any suitable means such, for example, as by the screws 26. A frame 27 is secured to the cover 25 and has mounted in it a plate of transparent material 28 such, for example, as glass, arranged at a 45°-angle to a hole or aperture 29 in the center wall or partition 22.

A silver rectangle 30 is mounted on the surface 31 of the glass plate 28 in line with the aperture 29 in order to reflect light coming from the compartment 24 through the aperture 29, into the eyepiece 32. Parts 28 and 30 may be referred to as light-comparison means.

The front wall 33 of the compartment 23 has an upper aperture or opening 34 in line with an aperture or opening 35 in the rear wall 36 of the compartment 23, the aperture 35 leading through the eyepiece 32.

A partially-reflecting and partially-transmitting mirror 37 or other member provided with a reflecting surface, hereinafter referred to as a mirror for convenience, may be pivoted at 38 to the front wall 33 and normally urged by a spring 39 to the angular position indicated in dotted outline in Fig. 4, and in full lines in Fig. 10.

The front wall 33 is also provided with a second or lower aperture 40, directly behind which is pivotally mounted a second or lower mirror 41 normally urged by a spring 42 to a downward position against the end 43 of an adjusting-screw 44 rotatable in indicating relation to a calibrated dial 45.

A bracket 46 has a base or support-portion 47 and carries a mirror 48 and a translucent screen 49. The translucent screen 49 has a transparent area, or hole, 50 therethrough. The bracket 46 is detachably connectible to the front wall 33 by means of a screw 51 extending through a hole 52 in the rear arm 53 of the bracket 46. In order to attach the bracket 46 to the wall 33 of the casing 21, the rear arm 53 of the bracket 46 is slid up along the outer face of the wall 33 to cause its upper edge 54 to engage the arm or projection 55 of the frame of the mirror 37 and thus swing the mirror down to the full-line position shown in Fig. 4 against the action of the spring 39, whereupon the screw 51 will be in proper position to screw into the threaded member or nut 56 fastened to the wall 33. When the bracket is thus connected to the wall 33, the translucent screen 49 and the transparent area or hole 50 therethrough which may either be in the form of an actual hole or of a transparent glass-like area, come within the area of the upper front aperture 34 in the wall 33. The angle which the mirror surface of the mirror 48 makes with the under or supporting surface of the base 47 of the bracket 46, is an acute angle of the same size as the angle between the mirror surface of the mirror 48 and the translucent surface of the translucent screen 49, and the projected planes of the mirror surface of mirror 48 and of the translucent surface of screen 49 intersect the plane of the supporting surface of base 47 at a common line.

The compartment 24 is provided with a cover 57 removably connected to the casing 21 by any suitable means such, for example, as the screws 58. Securely mounted upon the cover 57 is an electric-lamp socket 59 adapted to screw-threadedly receive a suitable electric bulb or lamp 60. An electric dry battery 61 is shown as carried by the cover 57 by means of a pair of side spring-arms 62 and 63, a top spring-arm 64 and a bottom supporting spring-arm 65 which latter also serves as one of the electric contact-arms of the battery, which battery is connectible to the lamp 60 by means of the upper fixed conductor 66 and the push-button-operated conductor 67 which can be moved against its spring action by the push button 68 to close the electric circuit to the lamp 60.

Also mounted on the cover 57 by means of a carrying arm or bracket 69 is a solenoid coil of wire 70 which is connected in the circuit with the electric lamp bulb 60 so that when the push button 68 closes the circuit by means of the spring-contact 67, the electric current from the battery flows in series through the solenoid coil 70 and the electric lamp bulb 60, all for a purpose as will be hereinafter fully explained.

Mounted on the partition 22 is a stud-shaft 71, rotatably mounted on which is a sleeve 72 secured against end displacement off of the shaft 71 by any suitable means such as a usual U-shaped clip 73. A supporting-disk 74, which may be of any suitable transparent material is firmly secured to the sleeve 72 for rotational movement therewith on the stud-shaft 71. Secured to the disk 74 is an arm 75 having a curved arm 76 of iron or other suitable magnetic material adapted to move into the opening or hole 77 in the solenoid coil 70. A coil-spring 78 has one end secured to the sleeve 72 and the other end secured to the arm 79 which, in turn, is secured to the partition 22. The solenoid armature 76 can be counterbalanced by a counterweight 80. The area 81 of the disk 74 can be made completely opaque and the area 82 of the disk 74 can be such as to variably limit the amount of light that passes through the aperture or opening 29, from the filament of the electric light bulb 60, the amount of light shut off or limited from passing through the aperture 29 depending upon the rotational position of the disk 74, and in consequence the rotational position of the light-limiting area 82. It will be appreciated that this variable or adjustable limitation of the percentage of light emitted by the electric bulb or lamp 60 that is permitted to pass through the opening 29 can be accomplished in various ways. In the particular form of the invention illustrated, the variation in limitation of the percentage of emitted light that is permitted to pass through the opening 29 is accomplished by means of two polarizing screens which may be in the form of two polarizing film members, one polarizing member occupying the area 82 referred to, and the other polarizing member being a fixed member 83 secured to the partition 22 right over the aperture 29. The polarizing members 82 and 83 may be two pieces of Polaroid film, so that when a moderate change in angular relationship between them occurs, as would be true when the member 82 mounted on the disk 74 is rotated in greater and greater degree against the action of spring 78, it limits in greater and greater degree the amount of light that is permitted to pass through the opening 29.

It is well known that sources of electrical power are subject to greater or less variation in voltage and in consequence variation of the amount of current output. This is particularly true in the case of a dry battery which, even if new, if subjected to a continuous long drain of a large amount of current, tends to temporarily have a fall of voltage, with consequent lowering of the current output. And after a dry battery becomes old, it is even more subject to drop-off in current and in consequence a drop-off in the amount of light given out by an electric lamp lighted by the battery. With the construction described, the parts are so adjusted that when the battery is new and giving its full voltage and full current output, when the switch-button 68 is pressed to send current through the lamp 60, the current also passes through the solenoid coil 70 and pulls the armature 76 to the maximum distance into the opening 77 in the solenoid 70 to which it is intended to be pulled, so as to bring over the hole or opening 29, that portion of the polarizing film 82 which, in conjunction with its complemental analyzing film-member 83 will have the maximum desired limiting or shutting-off of light from the lamp 60. As the current from the battery decreases, the current through the solenoid coil also decreases and therefore pulls less upon the armature 76 which will be held by the spring 78 at an intermediate position to thus change the angular relationship between the two polarizing film-members 82 and 83 to thus permit more of the light emitted by the bulb 60 to pass through the hole 29. The construction is so arranged as to limit a less and less percentage of the emitted light as the light grows weaker, or in other words, to permit the passage of a higher and higher percentage of the emitted light as the light grows weaker, so that regardless of the intensity of light emitted by the bulb 60, the intensity of the light rays passing through the opening 29 will be constant throughout a predetermined strength-condition of the battery. If desired, after the battery has weakened to a certain degree, the opaque area 81 can be provided to cover the hole 29 to thus prevent passage of substantially any light therethrough, whereupon the operator will be warned that it will be necessary to supply a new battery before the device will be in condition for proper operation. A limit-pin 84 can be secured to the partition 22 to limit the movement of the arm 75 by the spring 78.

A shaft 85 is rotatably secured to the cover 25 by an adjusting-knob 86 adjustably securable on the shaft 85 by any suitable means such, for example, as a screw 87. Rigidly secured to the shaft 85 is a density-wedge 88 in the form of a disk which may be in the form of a piece of photographic film in which successive portions of the film circumferentially of the disk are of successively greater and greater density or opacity, this variable density being arranged with a definite relationship to a calibrated disk 89 which is secured to the adjusting-knob 86 and which calibrated disk 89 rotatably cooperates with another calibrated disk 90 secured to the outer face of the cover 25. By rotating the density-wedge 88 to various positions, various amounts of light will be permitted to reach the small mirror-member 30. Thus, when light enters the aperture 34 in the front wall, for instance, from any source, its intensity can be compared with the known standard from the electric light bulb 60 which is maintained at constant effectiveness in the manner hereinbefore set forth, the relation between the density of the light coming through the opening 34 and the intensity of the standard light coming through the density-wedge 88 being determined by rotating the knob 86 until the mirror-spot 30 and the surrounding area when viewed through the eyepiece 32 appear to have a uniform light density so that the spot 30 disappears from view.

When light from an enlarger lens (not shown) is directed downward upon the mirror 48 (Fig. 4), it is reflected by the latter onto the translucent screen 49, and when the image reflected from the mirror 48 onto the translucent screen 49 is viewed through the eyepiece 32, it appears many times more brilliant than if viewed directly from the diffused surface of the enlarging easel, so that light-intensity readings may be easily obtained in areas of minimum light by means of the calibrated dial-members 89 and 90. The transparent area or hole 50 is used as a sight. When taking light-intensity readings, the instrument is held so the reflection of the enlarger lens (not shown) is seen through the hole 50. Then the light to be evaluated is striking the screen 49 perpendicularly and the full light value is measured. When the image is sharp on the screen 49, the image will also be sharp on the enlarging easel on which the base 47 rests. In this way the instrument aids in obtaining sharp focus, and the light-value readings are always obtained in the focal plane. With a good amount of light coming through the enlarger lens (not shown), an area is selected that is the brightest spot in the image, and the instrument is held so this brightest area appears behind the comparison mirror or dot 30, and the instrument is held at such an angle that the reflection of the enlarger lens can be seen through the hole 50 above the comparison dot 30, and the knob 86 is rotated until the dot 30 blends with the background and so disappears, while the instrument is so held that the enlarger lens (not shown) still appears through the sight-hole 50, to thus ensure that the light is striking the screen 49 perpendicularly and thus that the full light value is being measured. When adjusting the light balance, the base or support 47 should touch the enlarging easel, but it may not necessarily lie flat on it, since, if the area of light being measured is in the right of the image, the base 47 will be held tilting to the left in order to get the lens reflection through the sight-hole 50, and if the reading is taken in the left of the image, the base 47 should tilt to the right.

When the instrument is to be used as a range finder or to obtain exposure values in connection with taking photographs, the bracket 46 is removed, whereupon the upper mirror 37 is swung by its spring 39 up to its position shown in Fig. 10. By now pointing the aperture 34 toward an object to be later photographed, and viewing it through the eyepiece 32, and rotating the screw 44 to vary the position of the lower mirror 41, when the mirror 41 is adjusted to the precise correct angle so as to cause the image which passes through the opening 34 and thence through the semi-transparent mirror 37 to the eyepiece 32, to coincide properly with the image which passes through the opening 40 and is reflected from the mirrors 41 and 37 to the eyepiece 32, the range or distance of the object from the operator can then be read from the scale 45. If so desired, the mirror 37 could always remain in its position shown in Fig. 10, even when the bracket 46 was secured in position by omitting the operating-arm or lug 55 from the mirror 37, in which instance the light passing through the opening 34 would be viewed through the semi-transparent mirror 37, and the calibrations of the instrument would take this into account. Or the mirror 37 could be a half-size mirror instead of a full-size mirror. When the instrument is to be used as an exposure meter to obtain exposure values, the light values coming through the apertures 34 and 40 are determined in comparison with the standard light value coming through the aperture 29 by looking through the eyepiece 32 and rotating the knob 86 until the mirror dot 30 just disappears, as hereinbefore explained.

In the form of the invention illustrated in Fig. 11, the cap or cover 91 (Fig. 3) is removed and a transparent rod 92 of Lucite or other suitable material is secured in place as shown in Fig. 11, with its one end 93 adjacent the filament of the electric bulb 60 and the other end 94 directed toward the center of the opening 34 but spaced somewhat from the edge or rim 95 of the opening, so as to permit of the placing of a photographic film or plate over the end 94 to view various portions of the photographic film or plate through the eyepiece 32 to compare the density of various portions thereof with the standard light coming through the opening 29 from the electric lamp 60 and determining the photographic density or light value of any desired parts of the film or plate by rotating the knob 86 until the mirror dot 30 disappears, and reading the density upon the scales 89 and 90 in a way well known to those skilled in the art.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A device of the class described comprising: a support; a mirror carried by said support at an acute angle to the supporting-surface of said support; a casing carried by said support; an artificial light-source; light-comparison means in said casing; a translucent screen between said mirror and said light-comparison means; said mirror being constructed and arranged to receive incident projected light from exterior of said casing and to reflect said light through said screen and to said light-comparison means; and said light-comparison means being constructed and arranged to receive light from said artificial light-source and direct light from said mirror and from said artificial light-source in a common direction the axis of which is at an acute angle to the said supporting-surface of said support.

2. A device of the class described comprising: a support; a mirror carried by said support at an acute angle to the supporting-surface of said support; a casing carried by said support; an artificial light-source; light-comparison means in said casing; a translucent screen between said mirror and said light-comparison means and provided with a transparent area; said mirror being constructed and arranged to receive incident projected light from exterior of said casing and to reflect said light through said screen and to said light-comparison means; and said light-comparison means being constructed and arranged to receive light from said artificial light-source and direct light from said mirror and from said artificial light-source in a common direction the axis of which is an acute angle to the said supporting-surface of said support.

CATON BRADLEY.